US006907564B1

(12) United States Patent
Burchhardt et al.

(10) Patent No.: US 6,907,564 B1
(45) Date of Patent: Jun. 14, 2005

(54) REPRESENTING IMS MESSAGES AS XML DOCUMENTS

(75) Inventors: Jan Burchhardt, Stuttgart (DE); Shyh-Mei F. Ho, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 09/587,581

(22) Filed: Jun. 5, 2000

Related U.S. Application Data

(60) Provisional application No. 60/151,479, filed on Aug. 30, 1999.

(51) Int. Cl.[7] .......................... G06F 15/00; G06F 17/21; G06F 17/24; G06F 17/00
(52) U.S. Cl. ........................ 715/513; 715/514; 715/515; 715/516; 715/522; 715/523
(58) Field of Search ............................... 715/513, 514, 715/515, 516, 522, 523

(56) References Cited

U.S. PATENT DOCUMENTS

| | | | | |
|---|---|---|---|---|
| 5,333,266 | A | | 7/1994 | Boaz et al. ................. 395/200 |
| 5,544,325 | A | | 8/1996 | Denny et al. ........... 395/200.17 |
| 5,715,453 | A | * | 2/1998 | Stewart ....................... 715/513 |
| 5,737,597 | A | * | 4/1998 | Blackman et al. .......... 707/102 |
| 5,781,739 | A | | 7/1998 | Bach et al. ............ 395/200.57 |
| 6,038,393 | A | * | 3/2000 | Iyengar et al. .............. 717/104 |
| 6,067,579 | A | * | 5/2000 | Hardman et al. ........... 709/328 |
| 6,182,029 | B1 | * | 1/2001 | Friedman ........................ 704/9 |
| 6,289,501 | B1 | * | 9/2001 | Mutschler, III ............. 717/114 |
| 6,292,932 | B1 | * | 9/2001 | Baisley et al. .............. 717/114 |
| 6,381,743 | B1 | * | 4/2002 | Mutschler, III ............. 717/104 |
| 6,418,400 | B1 | * | 7/2002 | Webber ........................ 703/22 |
| 6,446,256 | B1 | * | 9/2002 | Hyman et al. ............... 717/143 |
| 6,560,633 | B1 | * | 5/2003 | Roberts et al. ............. 709/202 |
| 6,601,071 | B1 | * | 7/2003 | Bowker et al. ............. 707/102 |
| 6,630,942 | B2 | * | 10/2003 | Gerra et al. ................. 345/744 |
| 2002/0099634 | A1 | * | 7/2002 | Coutts et al. .................. 705/35 |

FOREIGN PATENT DOCUMENTS

| | | | |
|---|---|---|---|
| EP | 805394 | 4/1997 | ............. G06F/9/46 |
| JP | 11025165 | 6/1997 | ........... G06F/17/60 |
| WO | WO 98/35284 | 8/1998 | |
| WO | WO 99/09659 | 2/1999 | |
| WO | WO 99/09723 | 2/1999 | ........... H04L/29/00 |

OTHER PUBLICATIONS

Brodsky, S.; "XMI Opens Application Interchange"; Mar. 30, 1999; IBM; pp. 1–12.*

W3C, "Web Interface Definition Language (WIDL)", Sep. 22, 1997, webMethods, Inc., http://www.w3.org/TR/NOTE–widl.*

W3C, "XHTML 1.0: The Extensible HypterText Markup Language", W3C Proposed Recommendation, Aug. 24, 1999, http://www.w3.org/TR/1999/PR–xhtml–19990824.*

Remote Execution of IMS Transactions for OS/2, IBM Technical Disclosure Bulletin, vol. 34 No. 7B, Dec. 1991, p. 16.

An 6226256, CICS Update '98, Paulley et al., i+ 176 pp.

(Continued)

*Primary Examiner*—Joseph Feild
*Assistant Examiner*—N Hillery
(74) *Attorney, Agent, or Firm*—Kunzler & Associates

(57) ABSTRACT

A computer-implemented method for representing IMS messages as XML documents includes generating an XML document template from an IMS message definition and merging an IMS message with the generated template to produce a corresponding XML document. A system for representing IMS messages as XML documents includes a template generation module configured to generate an XML document template from an IMS message definition and a merging module configured to merge an IMS message with the generated template to produce a corresponding XML document.

27 Claims, 9 Drawing Sheets

OTHER PUBLICATIONS

An 2958744, IMS Management Facilities Help Midwestern Bank Improve IMF Performance, Cheeseman et al., Magazine of Bank Administration, vol. 63, No. 6, pp. 68–70, Jun. 1987.

RD 413108 A, International Business Machines, Sep. 10, 1998.

* cited by examiner

REPRESENTING IMS MESSAGES AS XML DOCUMENTS

RELATED APPLICATIONS

This application claims the benefit of U.S. patent application Ser. No. 60/151,479, filed Aug. 30, 1999, for "IMS Messages in XMI," which is incorporated herein by reference.

BACKGROUND OF THE INVENTION

1. Field of the Invention

The present invention relates generally to transaction processing systems. More particularly, the present invention relates to a system and method for representing IMS messages as XML documents.

2. Identification of Copyright

A portion of the disclosure of this patent document contains material subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

3. Relevant Technology

With the explosive growth of the Internet, most of the world's computer systems are now interconnected or capable of being interconnected. However, in order to share data, the systems need to understand each other's data formats. In recent years, the computer industry has evolved at such a rapid pace that systems developed only a few years apart use vastly different and incompatible formats. Such incompatibility problems tend to increase with the "age" differences of the systems.

The Information Management System (IMS) is one of the oldest and perhaps the most popular transaction processing (TP) systems. A TP system supervises the sharing of resources for concurrently processing multiple transactions, such as queries to a database. Anyone who has ever used an ATM, rented a car, or booked a flight, has probably used IMS.

IMS was developed by IBM in the 1960's as a inventory tracking system for the U.S. moon landing effort. Today, interfacing IMS with newer systems, particularly with systems of different manufactures over the Internet, is problematic.

As illustrated in FIG. 1, an IMS 10 typically includes two major components: an IMS Transaction Monitor (IMS/TM) 12, which is responsible for scheduling, authorization, presentation services and operational functions, and a hierarchical database 14, DL/1. Both components are independently configurable. For example the IMS/TM 12 can use a relational database, such as DB/2, rather than DL/1. The various components of an IMS 10 communicate via the MVS operating system 16.

As illustrated FIG. 2, the architecture of IMS is divided into four regions: a message processing region (MPR) 20, a batch message processing (BMP) 22 region, an interactive fast path (IFP) 26 region, and an IMS control (IMSCTL) 24 region. The MPR 20 is used to execute message-driven applications 18. Execution of applications 18 in this region 20 is triggered by incoming messages, such as those received from a terminal.

By contrast, applications 18 in the BMP 22 are not message driven. They are usually scheduled to run at times of low system activity, such as nights and weekends. Typically, such applications 18 perform a number of predefined operations, after which they immediately terminate.

The IFP 24 allows fast and simple requests to the hierarchical database 14. Applications 18 operating in the IFP 24 bypass the normal scheduling mechanism, providing relatively fast response times. In general, IFP applications 18 stay resident even if they are not needed.

The IMSCTL 26 is responsible for overseeing all TP tasks, as well as for controlling all dependent regions (e.g., MPR 20, BMP 22, and IFP 24). Essentially, the IMSCTL 26 has three main responsibilities: telecommunications, message scheduling, and logging/restart.

For example, as illustrated in FIG. 3, the IMSCTL 26 controls one or more connected terminals 28, sending and receiving messages to and from the terminals 28. Moreover, the IMSCTL 26 logs all transactions in order to provide the capability of undoing non-committed transactions in the event of a system failure.

In addition, every time the IMSCTL 26 receives an input message 30 from a terminal 28, it schedules an application 18 to process the message 30. The IMSCTL 26 identifies the desired application 18 and puts the message 30 in the application's message queue 32. The application 18 processes the message 30 and responds to the originating terminal 28 by placing an output message 30 in the terminal's message queue 34.

As illustrated in FIG. 4, an input message 30 typically includes the following fields:

LL Length of the message segment.

ZZ Reserved for IMS.

TRANCODE Transaction code that identifies the application 18.

Text Message text sent from the terminal 28 to the application 18. The structure of an output message 30 is similar, except that the TRANCODE field is missing.

In general, messages 30 belong to one particular IMS application 18. When the application 18 is implemented, the format of the message 30, including the types and lengths of its fields, must be defined. The format of a message 30 is referred to herein as a message definition 38. Message definitions 38 may be implemented using various programming languages, such as COBOL, assembler, PL/I and Pascal. For example, the message definition 38 illustrated in FIG. 4 is implemented in COBOL.

Unfortunately, IMS messages 30 are in a proprietary format, whereas the Internet is based on open standards, such as the HyperText Markup Language (HTML), a variant of the extensible Markup Language (XML). As a result, interfacing IMS with remote systems via the Internet can be difficult. Accordingly, what is needed is a system and method for representing IMS messages 30 in an open, interchangeable format, such as XML.

SUMMARY OF THE INVENTION

The present invention solves many or all of the foregoing problems by providing a system and method for representing IMS messages as XML documents. In one aspect of the invention, a method includes generating an XML document template from an IMS message definition and merging an IMS message with the generated template to produce a corresponding XML document.

In another aspect, a process of generating the XML document template includes obtaining an IMS message definition; obtaining a DTD for representing arbitrary IMS message definitions; compiling the IMS message definition with an option configured to produce an associated data (Adata) file; and parsing the Adata file using the DTD to generate an XML document template corresponding to the IMS message definition.

In various embodiments, the IMS message definition may include program source code in a language selected from the group consisting of COBOL, PL/I, Assembler, and Pascal. Additionally, the Adata file may include at least one IMS message definition in a relatively language independent format compared with the program source code.

In another aspect, a process of obtaining the DTD may include creating a UML object model for representing arbitrary IMS message definitions; and processing the object model using an XMI utility to generate the DTD.

In still another aspect, a process of merging the XML document template with the IMS message may include identifying a placeholder within XML document template for receiving a corresponding value from the IMS message; reading the value from the IMS message; and inserting the value into a location within the XML document template indicated by the placeholder. In certain embodiments, the placeholder may be implemented as an XML tag.

In still another embodiment of the invention, a placeholder may include an associated tag for indicating that a corresponding value exists within the IMS message. Additionally, a placeholder may include an associated tag for indicating the size of the corresponding value within the IMS message.

In yet another aspect, a system for representing IMS messages as XML documents may include a template generation module configured to generate an XML document template from an IMS message definition; and a merging module configured to merge an IMS message with the generated template to produce a corresponding XML document.

In various embodiments, the template generating module may include a compiler configured to compile an [MS message definition with an option configured to produce an associated data (Adata) file; and a parser configured to parse the Adata file using a DTD for representing arbitrary IMS message definitions to generate an XML document template corresponding to the IMS message definition.

In certain embodiments, the system may also include a modeling tool configured to create a UML object model for representing arbitrary IMS message definitions; and an XMI utility for generating the DTD from the UML object model.

These and other objects, features, and advantages of the present invention will become more fully apparent from the following description and appended claims, or may be learned by the practice of the invention as set forth hereinafter.

BRIEF DESCRIPTION OF THE DRAWINGS

The present invention is more fully disclosed in the following specification, with reference to the accompanying drawings, in which.

DETAILED DESCRIPTION OF THE PREFERRED EMBODIMENTS

Figure 1:
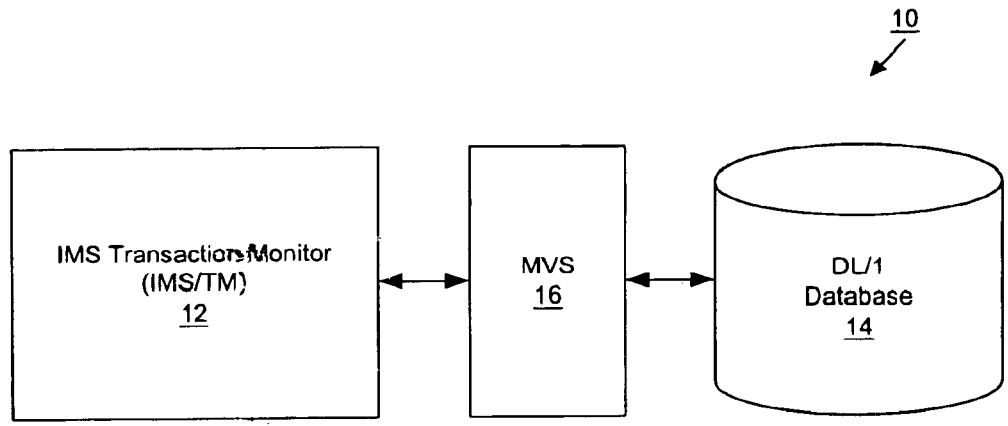
FIG. 1 is a schematic block diagram of an Information Management System (IMS)
Figure 2:
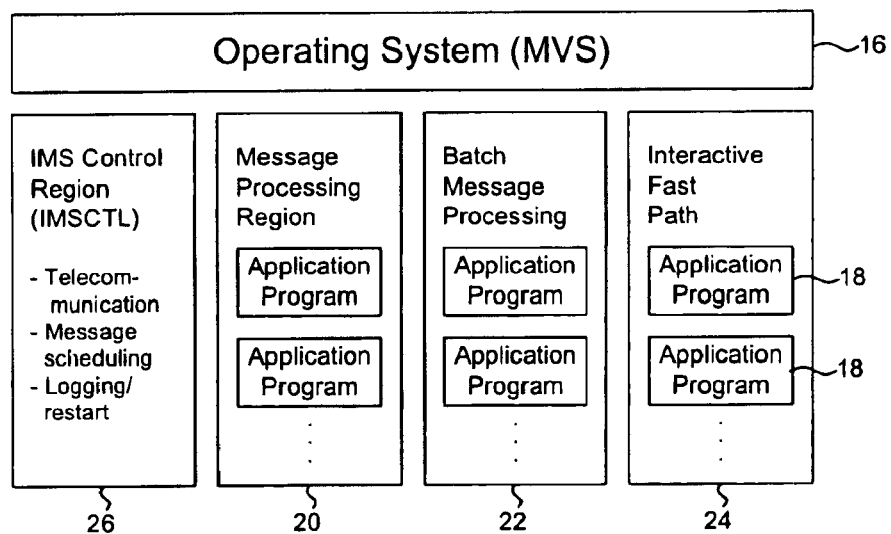
FIG. 2 is a schematic block diagram of IMS processing regions.
Figure 3:
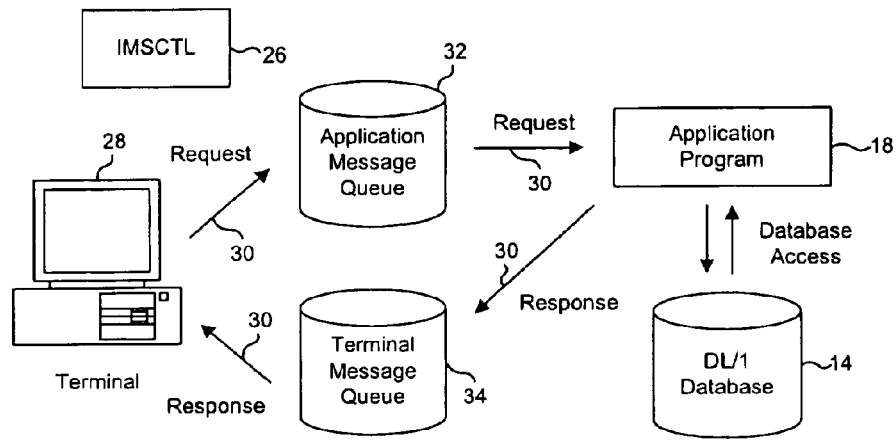
FIG. 3 is a schematic block diagram of message processing within an IMS.
Figure 4:
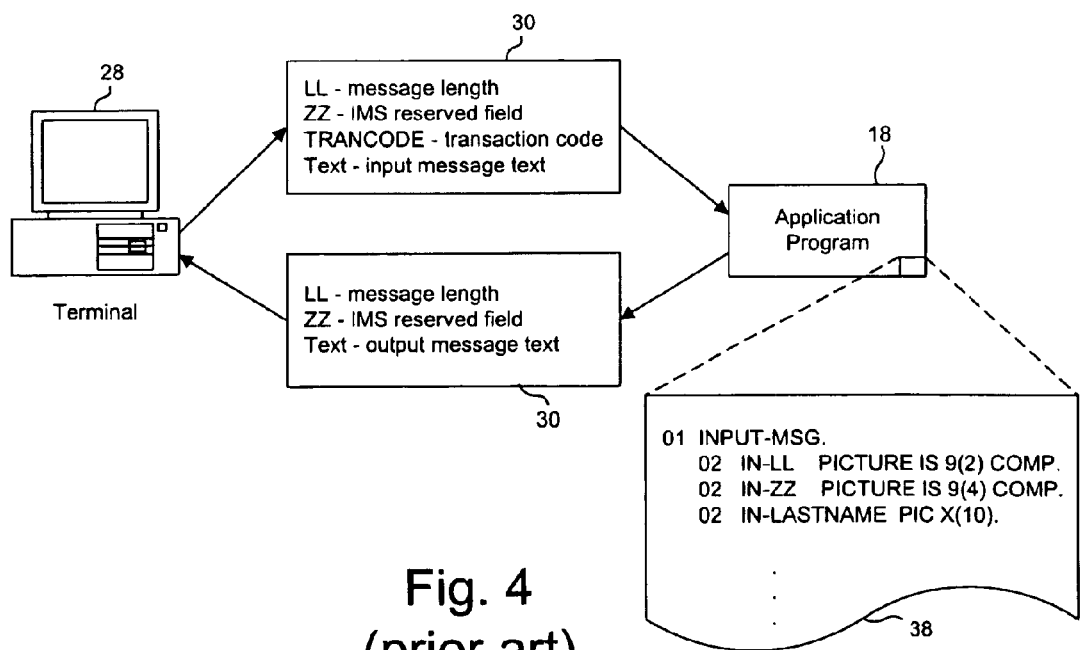
FIG. 4 is a schematic block diagram of the structure of IMS messages.

Certain presently preferred embodiments of the invention are now described with reference to the Figures, where like reference numbers indicate identical or functionally similar elements. The components of the present invention, as generally described and illustrated in the Figures, may be implemented in a variety of configurations. Thus, the following more detailed description of the embodiments of the system and method of the present invention, as represented in the Figures, is not intended to limit the scope of the invention, as claimed, but is merely representative of presently preferred embodiments of the invention.

Throughout the following description, various system components are referred to as "modules" or the like. In certain embodiments, these components may be implemented as software, hardware, firmware, or any combination thereof.

For example, as used herein, a module may include any type of computer instruction or computer executable code located within a memory device and/or transmitted as electronic signals over a system bus or network. An identified module may include, for instance, one or more physical or logical blocks of computer instructions, which may be embodied within one or more objects, procedures, functions, or the like.

The identified modules need not be located physically together, but may include disparate instructions stored at different memory locations, which together implement the described logical functionality of the module. Indeed, a module may include a single instruction, or many instructions, and may even be distributed among several discrete code segments, within different programs, and across several memory devices.

Obtaining Message Definitions from an Application

As noted, IMS messages 30 are defined within a corresponding application 18. As such, in order to generate an XML document that represents a message 30, a technique for obtaining a message definition 38 from an application 18 would be highly desirable.

In certain embodiments, the format of a message 30 may be directly obtained from an application's source code using a specially-designed parser. For example, the following is a typical COBOL message definition 38, which may be analyzed by the parser:

```
01 INPUT-MSG.
    02 IN-LL            PICTURE IS 9(2).
    02 IN-ZZ            PICTURE IS 9(4).
    02 IN-TRAN          PICTURE IS X(10).
    02 IN-COMMAND       PICTURE IS X(8).
    02 TEMP-COMMAND     REDEFINES IN-COMMAND.
        04 TEMP-IOCMD       PIC X(3).
        04 TEMP-FILLER      PIC X(5).
```

However, COBOL has a very complex syntax. For example, variable definitions in COBOL may include complex dependencies, making the source code of message definitions 30 difficult to parse. Moreover, because each language is different, a different parser would typically be required for each different programming language, such as PL/I and Assembler.

Accordingly, in one embodiment of the invention, message definitions 38 are obtained from a System Associated Data (SysAdata) file 78 (illustrated in FIG. 7), which is produced by various compilers 76 when the "adata" option is specified. In essence, the SysAdata file 78 is a compiler-generated debugging aid. It contains information about the structure of a program, the contained data, the data flow within the program, and the system in which the program operates.

One reason for relying the SysAdata file 78 rather than the application source code 74 is that a single parser may be used for different programming languages. For example, PL/I compilers and some high-level assemblers also generate SysAdata files 78. Although some differences exist in the SysAdata files 78 produced by different compilers 76, such differences may be compensated for by those skilled in the art.

A record of the SysAdata file 78 generally includes the following two sections:

1. a 12 byte header section, which has the same structure for all record types; and 2. a variable length data section, which varies by record type. To extract a message definition 38 from a SysAdata file 78, not all record types are needed. For example, in one embodiment, only the Common Header Section, the Compilation Unit Start/End Record, and the Symbol Record are used. These records are described in greater detail below.

The format of the various records within the SysAdata file 78 are shown in Tables 1–3, with the following abbreviations being used to indicate data types:

c indicates character (EBCDIC or ASCII) data;

h indicates 2-byte binary integer data;

f indicates 4-byte binary integer data;

x indicates hexadecimal data or 1-byte binary integer data with the length of the number given behind the data type.

Common Header Section

The Common Header Section contains, among other things, a record code that identifies type and length of the record. The 12 byte header section has the following format:

TABLE 1

| Field | Size | Description | |
|---|---|---|---|
| Language Code | x 1 | 16 | High Level Assembler |
| | | 17 | COBOL on all platforms |
| | | 40 | PL/I on supported platforms |
| Record type | h 2 | x 0000 | Job Identification record |
| | | x 0001 | ADATA Identification record |
| | | x 0002 | Compilation unit start/end record |
| | | x 0010 | Options record |
| | | x 0020 | External Symbol record |
| | | x 0024 | Parse Tree record |
| | | x 0030 | Token record |
| | | x 0032 | Source Error record |
| | | x 0038 | Source record |
| | | x 0039 | COPY REPLACING record |
| | | x 0042 | Symbol record |
| | | x 0044 | Symbol Cross-Reference record |
| | | x 0046 | Nested Program record |
| | | x 0060 | Library record |
| | | x 0090 | Statistics record |
| | | x 0120 | EVENTS record |
| Adata architecture level | x 1 | 3 | Definition level for the header structure |
| Flag | x 1 | ..... ..1. | Adata record integer are in Little Endian (Intel) format |
| | | ..... ...1 | This record is continued in the next record |
| | | 1111 11.. | Reserved for future use |
| Adata record edition level | x 1 | | Used to indicate a new format for a specific record type. Usually zero. |
| Reserved | c 4 | | Reserved for future use |
| Adata field length | h 2 | | The length in bytes of the data following the header. |

Compilation Unit Start/End Record

The Compilation Unit Start/End Record is the second and the last record in the SysAdata file 78. The 8 byte record uses the following format:

TABLE 2

| Field | Size | Description | |
|---|---|---|---|
| Type | h 2 | Compilation unit type, which can be one of the following: | |
| | | x0000 | Start compilation unit |
| | | x0001 | End compilation unit |
| Reserved | c 2 | Reserved for future use | |
| Reserved | f 4 | Reserved for future use | |

Symbol Record

The Symbol Record contains all of the information needed to understand the structure of a message definition 38 that has been compiled into a SysAdata file 78. Only the fields that are used in a presently preferred embodiment of the invention are listed in Table 3. For simplicity, Table 3 only indicate the size, and not the position, of the fields. The position of the fields can be determined from the source code of Appendix A by those skilled in the art.

TABLE 3

| Field | Size | Description |
|---|---|---|
| Symbol ID | f 4 | Unique ID of symbol |
| Level | f 4 | True leve number of symbol (or relative level number of a data item within a structure). Level is in the range of 01–49, 66 (for rename items), 77, or 88 (for condition items). |

TABLE 3-continued

| Field | Size | Description | |
|---|---|---|---|
| Symbol Type | x 1 | x 68 | Class name |
| | | x 58 | Method name |
| | | x 40 | Data name |
| | | x 20 | Procedure name |
| | | x 10 | Mnemonic name |
| | | x 08 | Program name |
| | | x 81 | Reserved |
| Symbol Attribute | x 1 | Numeric | |
| | x 2 | Alphanumeric | |
| | x 3 | Group | |
| | | note: other attributes are ignored | |
| Clauses | x 1 | For numeric, alpha numeric and group items: | |
| | | 1... .... | Value |
| | | .1.. .... | Indexed |
| | | ..1. .... | Redefines |
| | | ...1 .... | Renames |
| | | .... 1... | Occurs |
| | | .... .1.. | Has Occurs Keys |
| | | .... ..1. | Occurs Depending on |
| | | .... ...1 | Occurs in Parent |
| | | note: other values are ignored | |
| Data Flags1 | x 1 | 1... .... | Redefined |
| | | .1.. .... | Renamed |
| | | ..1. .... | Synchronized |
| | | ...1 .... | Implicity redefined |
| | | .... 1... | Date field |
| | | .... .1.. | Implicit redefines |
| | | .... ..1. | FILLER |
| | | .... ...1 | Level 77 |
| Size | f 4 | the size of this data item. The actual number of bytes this item occupies in storage. Also referred to as the "Length Attribute." | |
| Parent ID | f 4 | The symbol ID of the immediate parent of the symbol being defined. | |
| Redefined ID | f4 | The symbol ID of the data item, that this item renames. | |
| Symbol Name Length | h 2 | The number of characters in the symbol name. | |

The source code of the application 18 and the SysAdata file 78 contain essentially the same information about the message definition 38. However, in order to read the source code, a parser would need to understand a subset of the COBOL language.

By contrast, the SysAdata file 78 has a clearly defined format, each bit having a definite meaning. Consequently, the SysAdata file 78 may be easier to read and understand, and the corresponding parser more simple and easy to implement.

Figure 7:
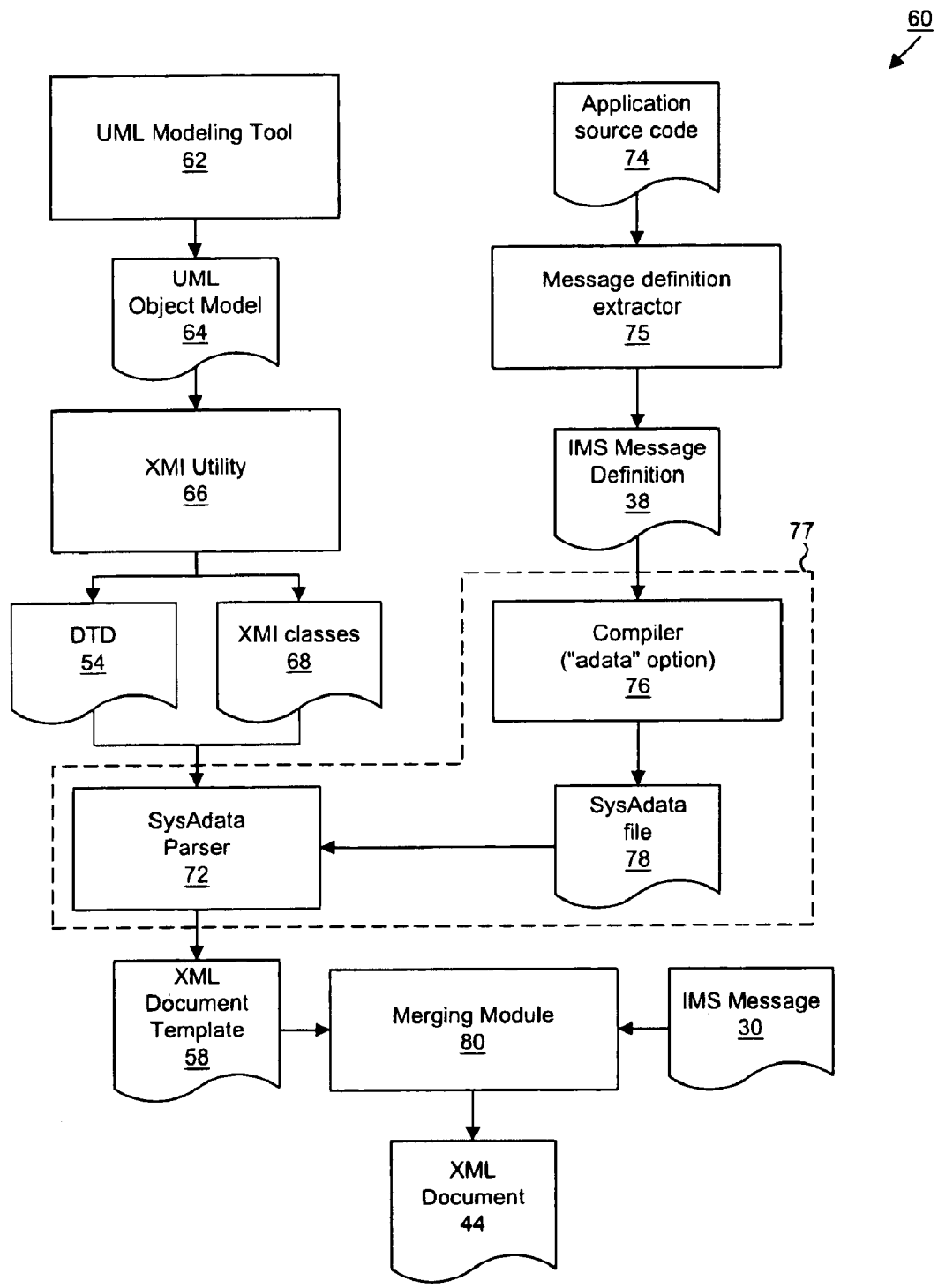
FIG. 7 is a schematic block diagram of a system for representing IMS messages as XML documents according to an embodiment of the invention.

As shown in FIG. 7, a compiler 76 produces the SysAdata file 78 when it is able to compile an application source code file 74 without major errors. Accordingly, a system and method in one embodiment of the invention verifies that the compilation completed with a return code of 4 or less. Analysis can still proceed if "Information" and "Warning" messages are generated, but there should be no "Error", "Severe error", or "Termination" messages.

In certain embodiments, compiling a subset of the application 18, i.e. the message definition 38, itself, is advantageous. For example, a particular message definition 38 may be extracted from the application's source code 74 or a copy file and copied into the working-storage section of a COBOL source file template for separate compilation. In certain embodiments, a message definition extractor 75 may be provided for this purpose, which may extract a user-specified message definition 38 from the source code 74 of an application 18. The extractor 75 may create a valid source file for a compiler 76 as illustrated below:

```
IDENTIFICATION DIVISION.
   PROGRAM-ID. EXAMPLE-MSG.
   ENVIRONMENT DIVISION.
   DATA DIVISION.
   WORKING-STORAGE SECTION.
   01 INPUT-MSG.
      02 IN-LL            PICTURE IS 9(2).
      02 IN-ZZ            PICTURE IS 9(4).
      02 IN-TRAN          PICTURE IS X(10).
      02 IN-COMMAND       PICTURE IS X(8).
      02 TEMP-COMMAND     REDEFINES IN-COMMAND.
         04 TEMP-IOCMD             PIC X(3).
         04 TEMP-FILLER            PIC X(5).
   PROCEDURE DIVISION.
      STOP RUN.
```

Of course, it would also be possible to read a SysAdata file 78 from the compilation process of an entire application 18. However, since one application 18 may include a plurality of messages definitions 38 in the working-storage section, a user would need to make a choice as to which message definition 38 to use.

Generating a Document Type Definition (DTD) for IMS Messages

In order to represent IMS messages 30 in XML, generating a Document Type Definition (DTD) 54 is highly desirable. Various techniques may be used to create the DTD 54. For example, in certain embodiments, a different DTD 54 may be created for each particular message 30. Such a DTD 54 would allow any XML parser to understand the structure of the associated message 30. In alternative embodiments, a generic DTD 54 for arbitrary messages 30 may be created. These two options are fundamentally different and are described more fully in the following sections.

One DTD Per Message Definition

Figure 5:
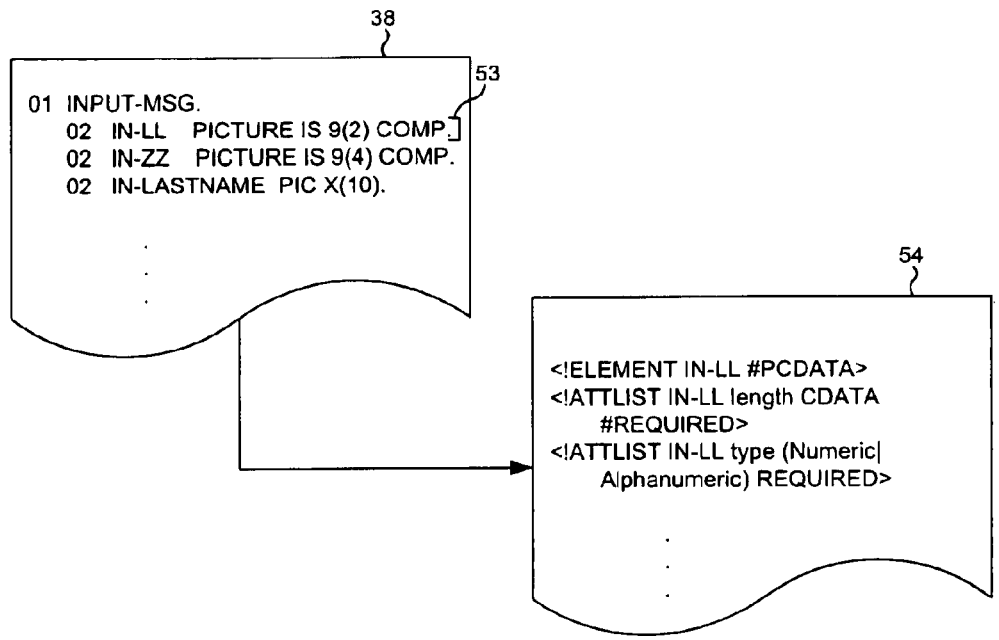
FIG. 5 is a schematic block diagram of a technique for representing an IMS message definition in XML according to an embodiment of the invention.

As illustrated in FIG. 5, each data entry 53 (e.g., variable or group) in the message definition 38 may be directly represented by an element in the DTD 54. Each element may have one or more attributes, which contain information about the data entry.

The benefit of this technique is that the corresponding XML documents 44 are relatively simple. For example, an XML document 44 corresponding to the message definition 38 of FIG. 5 may include the following:

```
<IN-LL length="2" type="Numeric">55</IN-LL>
<IN-ZZ length="4" type="Numeric">102</IN-ZZ>
<IN-LASTNAME length="10" type="Alphanumeric">Meyer</
IN-LASTNAME>
```

Although this approach results in a straightforward DTD 54 and simple XML documents 44, it has two major disadvantages. First, no tool can be effectively used to create the DTD 54. Rules governing DTD 54 creation typically need to be implemented in a parser. Second, because different names may be used for elements and attributes, no generalized techniques for reading and writing corresponding XML documents 44 may be provided.

Generic DTD for all Messages

Figure 6:
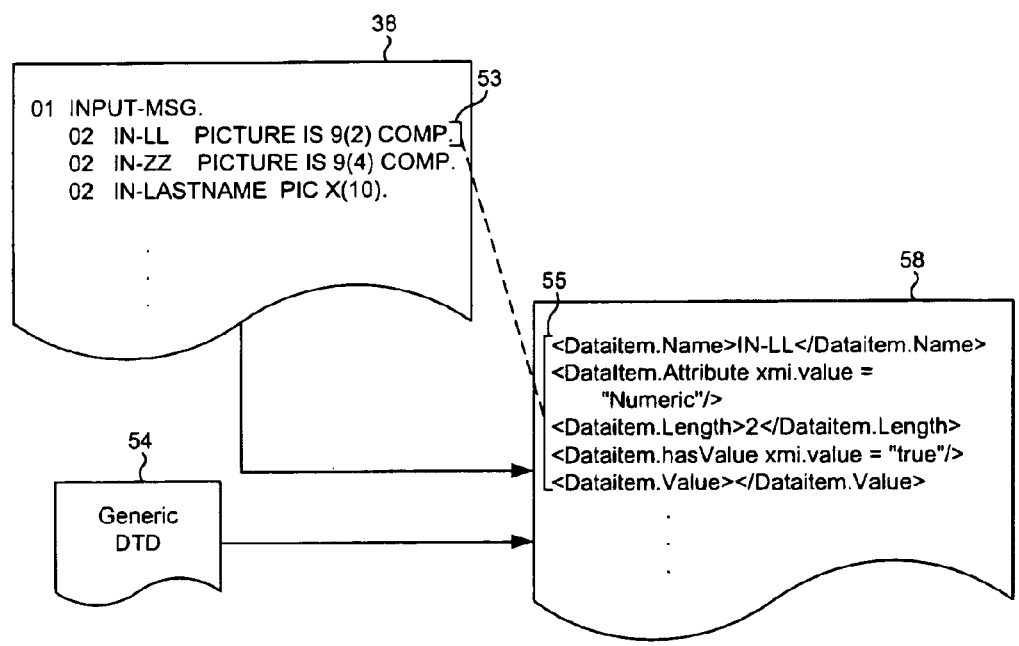
FIG. 6 is a schematic block diagram of an alternative technique for representing an IMS message definition in XML according to an embodiment of the invention.

In an alternative embodiment, as illustrated in FIG. 6, a single, generic DTD 54 may be used for all IMS messages 30. In this case, each data entry 53 from a message definition 38 may be represented as a "DataItem" 55. The structure of a DataItem 55 is defined in the DTD 54 of Appendix C, and is described in greater detail below.

The generic DTD 54 approach offers several advantages. First, the generic DTD 54 may be created using standard tools from a UML object model, as explained below. Second, an XMI utility, such as IBM's XMI Toolkit™, may be used to provide generic access methods for reading and writing XML documents 44. Third, the generic DTD 54 is relatively language independent (compared to source code 74), such that message definitions 38 implemented in Assembler, PL/I, or the like can be presented in the same way. Finally, the DTD 54 may be maintained and updated in a common location.

Using the generic DTD 54 approach, as illustrated in FIG. 6, a message definition 38 may be transformed into an XML document template 58 that represents the format of a particular message 30. Later, a merging module 80 may be used to merge the actual IMS message 30 with the template 58 to create an XML document 44 that represents the message 30. This process is described in greater detail below.

Modeling MS Message Definitions

FIG. 7 illustrates a system 60 for generating the above-described DTD 54 and XML document templates 58 according to an embodiment of the invention. The system 60 may include a Uniform Modeling Language (UML) modeling tool 62. The UML modeling tool 62 may be used to produce a generic UML object model 64 to represent arbitrary IMS messages 30. In one embodiment, the UML modeling tool 62 is Rational Rose™, a visual modeling tool available from Rational Software.

UML is a language for specifying, visualizing, constructing, and documenting software systems, in addition to business models and the like. UML is capable of representing the static, dynamic, environmental, and organizational aspects of almost any system.

In order to generate a DTD 54, the abstract structure of the message 30 should be modeled. As noted above, in one embodiment, each data entry 53 of the message definition 38 may be represented as a DataItem 55, whether the entry is a group, a redefined variable, or a normal variable. For example, if a data entry 53 is a group, all group members are also DataItems 55, but they are one level lower in the object hierarchy of the model.

Figure 8:
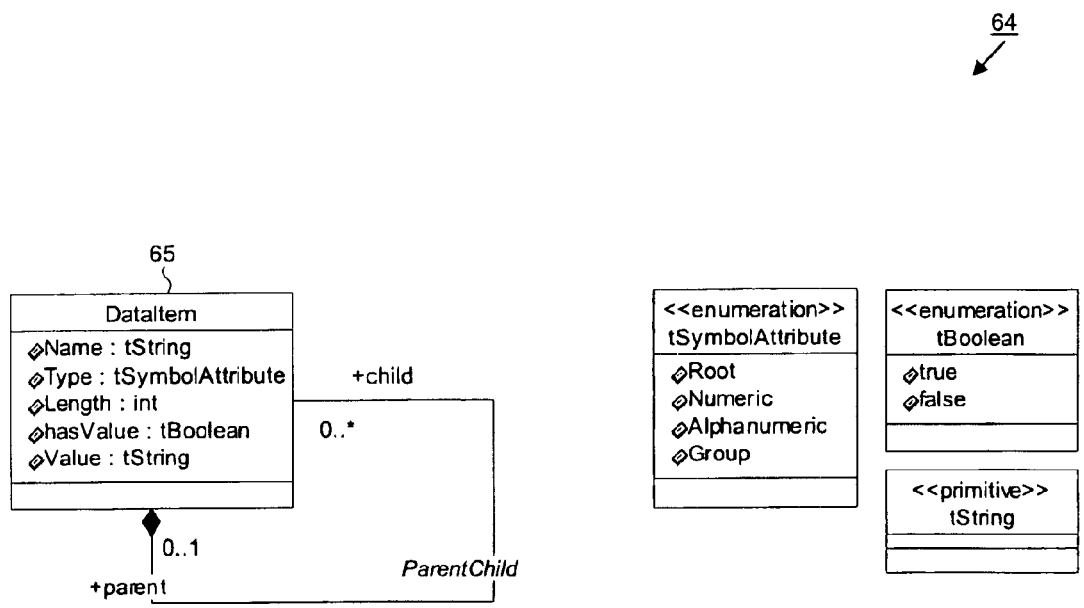
FIG. 8 is a schematic block diagram of a UML object model of an IMS message definition according to an embodiment of the invention.

FIG. 8 illustrates a UML object model 64 of an IMS message definition 38 according to one embodiment of the invention, as implemented by the UML modeling tool 62. In various embodiments, the model 64 includes a DataItem class 65 for representing each data entry 53 of the message definition 38. An instance of the DataItem class 65 stores data retrieved from a Symbol Record of a SysAdata file 78, as explained below.

In various embodiments, the DataItem class 65 includes a number of attributes:

Name: Contains the name of the data entry 53 represented by an instance of the class.

Type: Contains the Symbol Attribute. Valid values are defined in Class tSymbolAttribute (see Table 3).

Length: Contains the length of the DataItem instance. If the data entry 53 is a group or the root element, the length is added to the length of all of the children.

hasValue: Indicates if the DataItem instance is used to store actual data or used to group other DataItems together. It also indicates whether the <Value> tag is present.

Value: Contains the value of the variable.

Figure 10:
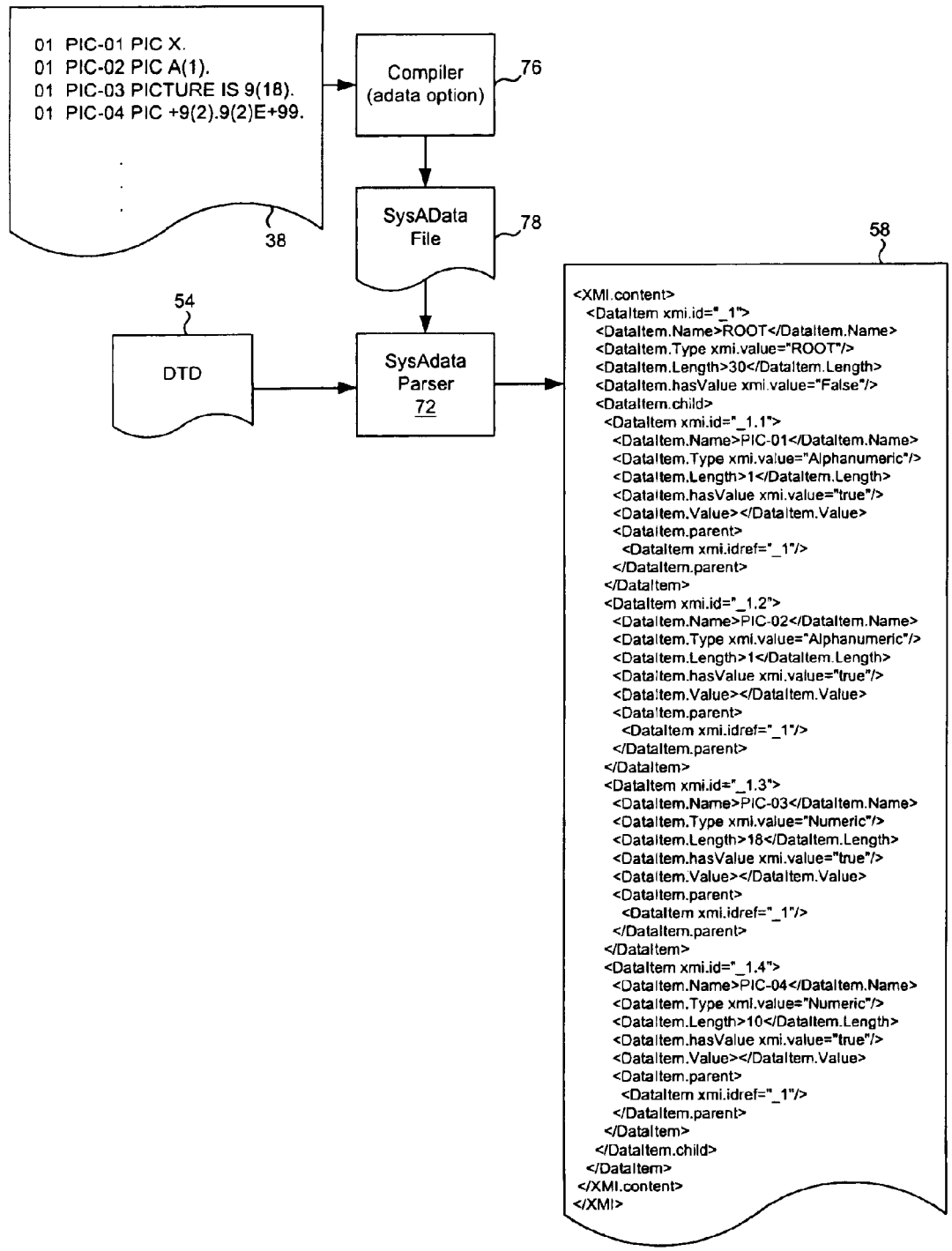
FIG. 10 is a schematic block diagram of a technique for representing an IMS message definition as an XML document template according to an embodiment of the invention.

As illustrated in the object model 64 of FIG. 10, a DataItem instance may have zero or more children. The children are also DataItem instances and are contained within the parent. Every DataItem instance has zero or one parent. Accordingly, the parent-child hierarchy of the object model 64 may be used to model the hierarchical structure of IMS message definitions 38.

In various embodiments, the classes tSymbolAttribute, tString and tBoolean may serve as type classes for the DataItem attributes. As such, attributes of the class tSymbolAttribute become possible values of the DataItem.Type attribute.

Referring again to FIG. 7, the system 60 may also include an XML Metadata Interchange (XMI) utility 66, such as XMI Toolkit™, available from IBM. XMI is an open standard released by the Object Management Group (OMG) for simplifying the exchange of data and metadata between different products from different vendors. IBM's XMI Toolkit is written entirely in Java and offers interfaces to facilitate incorporation into other projects or products. However, languages other than Java may be used in various implementations.

In one embodiment, the XMI utility 66 automatically generates the DTD 54 from the UML object model 64. The following is a portion of a DTD 54 for IMS messages 30 according to an embodiment of the invention. A more complete DTD 54 including XMI-specific additions may be found in Appendix C.

```
<!ELEMENT DataItem   (DataItem.Name?, DataItem.Type?, DataItem.Length?,
                     DataItem.hasValue?, DataItem.Value?, XNU,extension*,
                     DataItem.parent?, DataItem.child*)? >
<!ATTLIST DataItem
            %XMI.element.att;
            %XMI.link.att; >
<!ELEMENT DataItem.parent (DataItem)? >
<!ELEMENT DataItem.child (Data Item)* >
<!ELEMENT DataItem.Name (#PCDATA | XMI.reference)* >
<!ELEMENT DataItem.Type EMPTY >
<!ATTLIST DataItem.Type xmi.value ( Root | Numeric | Alphanumeric | Group
) #REQUIRED >
<!ELEMENT DataItem.Length (#PCDATA | XMI.reference)* >
<!ELEMENT DataItem.hasValue Empty >
<!ATTLIST DataItem.hasValue xmi.value ( true | false ) #REQUIRED >
<!ELEMENT DataItem.Value (#PCDATA | XMI.reference)* >
```

In addition, the XMI utility 66 may create a plurality of Java XMI document access classes 68, which are used to read and write XML files based on the DTD 54, as described more fully below.

Generating XML Document Templates

Referring again to FIG. 7, the system 60 may also include a SysAdata parser 72, which uses the generated DTD 54 and XMI classes 68 to parse the SysAdata file 78. As previously noted, the SysAdata file 78 may be generated by a compiler 76, such as IBM's Visual Ageu COBOL compiler, while compiling an application 18 from source code 74. In one embodiment, the output of the parser 72 is an XML document template 58 that represents the format of a particular IMS message 30. As used herein, the parser 72 and the compiler 76 may be referred to collectively as a template generation module 77.

In alternative embodiments, however, the template generation module 77 may not include the compiler 76. For example, the template generation module 77 may directly parse and transform the message definition 38 into an XML document template 58.

Figure 9:
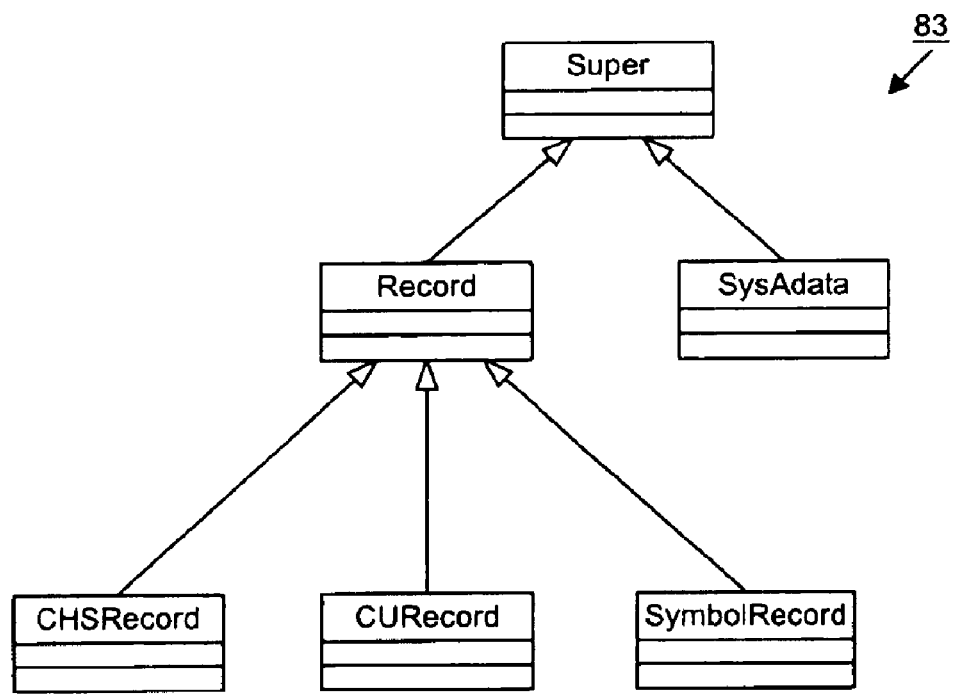
FIG. 9 is a class hierarchy of a parser according to an embodiment of the invention.

As noted, the XMI utility 66 may also produce Java XMI classes 68 to read and write XML files. Accordingly, the parser 72 may be implemented in Java, although the invention is not limited in this respect. FIG. 9 illustrates a class hierarchy 83 of the parser 72 according to an embodiment of the invention. The source code and a brief description of the classes may be found in Appendices A and B, respectively.

FIG. 10 further illustrates the above-described process of generating an XML document template 58 from an IMS message definition 38. As illustrated, the <DataItem.Value> tags are empty since no values from an IMS message 30 have been supplied. Later, as described below, the IMS message 30 will be merged with the template 58 to create the XML document 44. The <DataItem.Value> tags function essentially as "place holders" for receiving corresponding values from the IMS message 30.

Figures 11, 12:
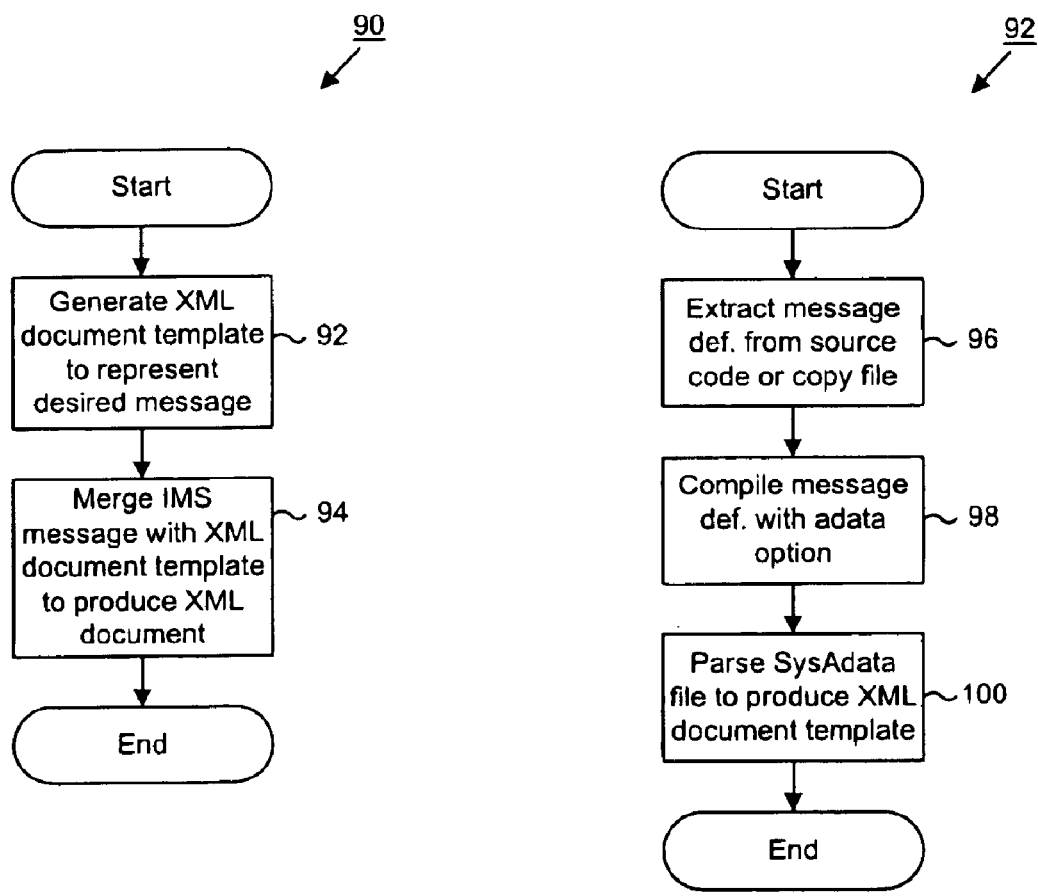
FIG. 11 is a schematic flowchart of a method for representing IMS messages as XML documents according to an embodiment of the invention.
FIG. 12 is a schematic flowchart of a process for generating an XML document template from an IMS message definition according to an embodiment of the invention.

Referring now to FIG. 11, a schematic flowchart illustrates a method 90 for representing IMS messages 30 as XML documents 44. In one embodiment, the method 90 begins by generating 92 an XML document template 58 for the message 30 to be represented. Thereafter, the method 90 continues by merging an IMS message 30 with the XML document template 58 to produce the XML document 44.

FIG. 12 provides further details of the process 92 of generating the XML document template 58. In one embodiment, the process 92 begins by extracting 96 a message definition 38 from the source code 74 of an IMS application 18 or an associated copy file. Thereafter, the process 92 continues by compiling 98 the extracted message definition 38 using the "adata" option. Finally, the process 92 concludes by parsing 100 the resulting SysAdata file 78 with the DTD 54 to produce the XML document template 58.

Figure 13:
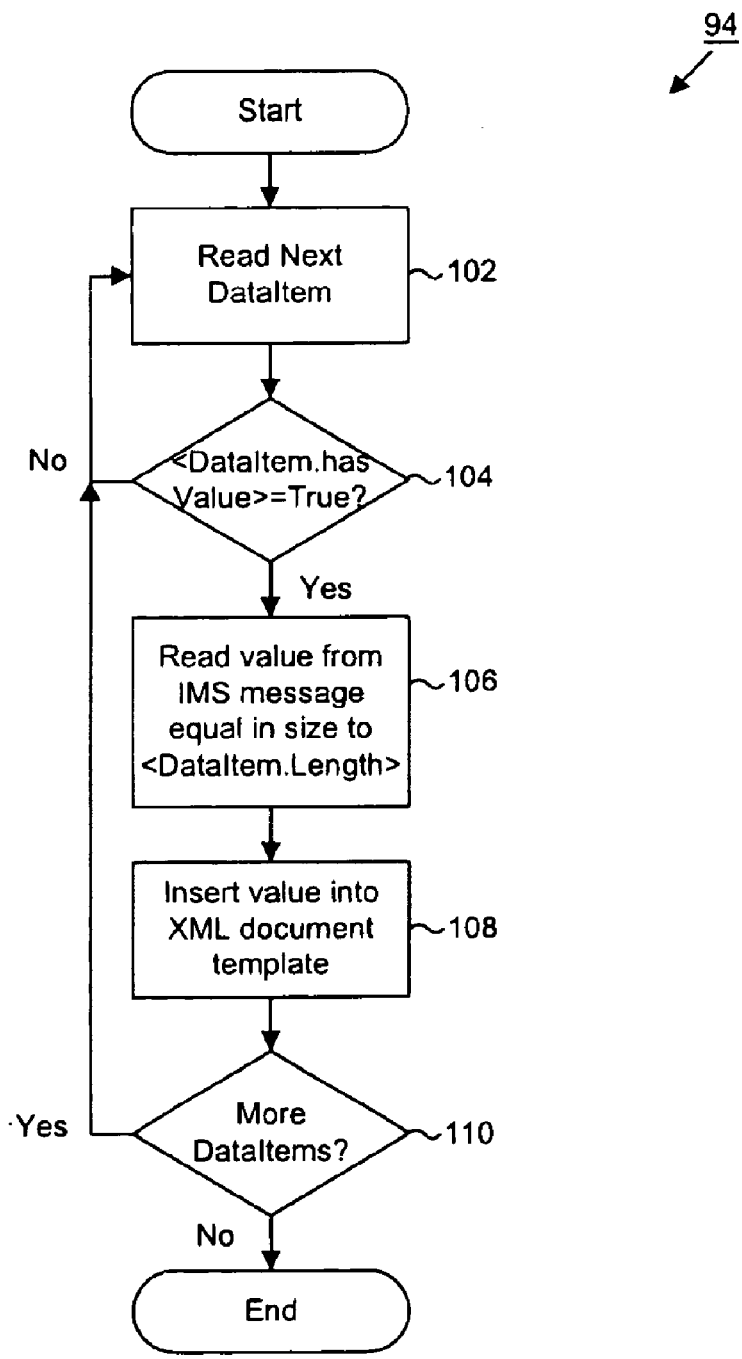
FIG. 13 is a schematic flowchart of a process for merging an XML document template with an IMS message according to an embodiment of the invention.

FIG. 13 shows the process 94 of merging the IMS message 30 with the XML document template 58 in additional detail. The process 94 may begin by reading 102 the next DataItem 55 from the XML document template 58. Thereafter, a determination 104 is made whether the <DataItem.hasValue> tag of the DataItem 55 has a "true" value. If not, the method returns to step 102 to read the next DataItem 55.

Otherwise, the process 94 may continue by reading 106 a value (e.g. a quantity of data) from the IMS message 30 equal in size to the value of the <DataItem.Length> tag. For example, if the <DataItem.Length> tag has a value of 5, the process 94 may read 106 the next 5 bytes from the IMS message 30 in one embodiment. Thereafter, the process 94 continues by inserting 108 the value read from the message 30 into the XML document template 58, i.e. within the <DataItem.Value> tags of the corresponding DataItem 55.

A determination 110 is then made as to whether more DataItems 55 remain in the XML document template 58. If so, the process 94 returns to step 102 to read the next DataItem 55. Otherwise, the process 94 is complete.

Based on the foregoing, the present invention offers a number of advantages over conventional IMS interface systems. For example, the present invention allows proprietary IMS messages 30 to be represented using openly interchangeable documents, such as XML documents 44. The documents 44 may comply with the latest XMI standard, which enables an IMS 10 to exchange data with a variety of XMI-enabled devices, such as Web browsers and the like.

Importantly, XML documents 44 may be easily converted for display on a variety of computing platform using the emerging XML Style Language (XSL) standard. As such, the XMI to IMS interface is capable of replacing all other interfaces between IMS and products from other vendors.

Additionally, because the SysAdata file 78 is used in one embodiment to obtain IMS message definitions 38, the invention is not limited to a single programming language as in conventional approaches. For example, a single parser 72 may be used with COBOL, PL/I, and other compilers.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

APPENDIX A

Source Code

```
/**
 * Superclass for all classes
 */
import java.io.*;
class Super {
        static FileOutputStream fos;
public static void trace(String s) {
        System.out.println(s);
        }
}
/**
 * Superclass for all record types. Provides methods to read adata in buffer.
 */
import java.io.*;
import java.lang.reflect.*;
import java.lang.Class.*;
class Record extends Super {
```

APPENDIX A-continued

Source Code

```
        int[ ] buffer;
        int length;
/**
* reads data from the sysadata file and fills the objects buffer
**/
public void fillBuffer(FileInputStream fis, int _length) {
        buffer = new int[_length];
        for (int i = 0; i ≦ length;i++){
            try{
                buffer[i] fis.read( );
            }catch(IOException e) {
            trace("Error in"+this.getClass( )+":" + e);
            }
        }
}
}
}
/**
* SysAdata reads and interprets a COBOL Associated Data (ADATA) file
* and creates the XMI document.
*/
import java.io.*;
import java.util.Vector;
import com.ibm.ims.message.*;
public class SysAdata extends Super {
 static FileInputStream fis = null;
static CHSRecord chs_rec;
static CURecord cu_rec;
static Vector symbolVector = new Vector( );
static Id model = null;
static int rootLength = 0;
/**
* addID adds one or more DataItem object to the model recursevily
*/
public static int addID(Id parent, int symbolNumber){
        SymbolRecord symbol = (SymbolRecord) symbolVector.elementAt(symbolNumber);
        try{
            trace("adding "+symbol.get Name( ));
            Id id = parent.add(Type.DATA_ITEM, null);
            id.set(Property.NAME, symbol.getName( ));
            id.set(Property.TYPE, symbol.getAttribute( ));
            id.set(Property.LENGTH, symbol.getLength( ));
            id.set(Property.HAS_VALUE, " "+symbol.hasValue( ));
            if(symbol.hasValue( )){
                rootLength = rootLength + symbol.getSize( );
                id.set(Property.VALUE, " ");
            }
            symbolNumber++;
            if((symbol.hasValue( ) == false) && (symbolNumber < symbolVector.size( ))){
                    SymbolRecord   nextSymbol   =   (SymbolRecord)
symbolVector.elementAt(symbolNumber);
                if(nextSymbol.redefines( )) {
                    symbolNumber = addID(id,symbolNumber);
                }
                else {
                    while((symbol.getLevel( )<nextSymbol.getLevel( )) && (symbolNumber
< symbolVector.size( ))){
                        symbolNumber = addID(id,symbolNumber);
                        if(symbolNumber < symbolVector.size( ))
                            nextSymbol = (SymbolRecord)
symbolVector.elementAt(symbolNumber);
                    }
                }
            }
        }catch(Exception e){e.printStackTrace( );}
        // returns the number of the next symbol to be processed
        return symbolNumber;
}
public static void main(String args[ ]){
        boolean loopflag = true;
        int counter = 0;
if(args.length > 1){
        //open adata file which is given as first argument in the parameter list
        try {
            fis = new FileInputStream(args[0]);
            //fis = new FileInputStream("d:/jan/parser/sysadata/data.adt");
        }
        catch(java.io.FileNotFoundException e){
```

APPENDIX A-continued

Source Code

```
                System.out.println("error" + e);
                return;
            }
            //reads first common header section (CHSRecord) from file
            chs_rec = new CHSRecord(fis);
/**
* loop reads records from the adata file
* checks for CURecord, SymbolRecord and skips all other records
* stores SymbolRecords in symbolVector
*/
            do{
                switch(chs_rec.getrecordType( )){
                    case 2: {
                        //Compilation Unit Record, 02hex
                        cu_rec = new CURecord(fis);
                        if(cu_rec.getType( ) == 1)
                        loopflag = false;
                        chs_rec.fill(fis);
                        break;}
                    case 66:{
                        //Symbol Record, 042hex
                            SymbolRecord   symbolrecord   =   new
SymbolRecord(fis,chs_rec.getrecordLength( ));
                            if(symbolrecord.getType( )==64)
                                symbolVector.addElement(symbolrecord);
                            chs_rec.fill(fis);
                            break;}
                    default:{
                        //all other records are skipped
                        skip(chs_rec.getrecordLength( ));
                        chs_rec.fill(fis);
                        break;}
                    }
            }while(loopflag);
            try{
                fis.close( );
            }catch(IOException e){trace(" "+e);}
            try {
                model = Model.instance( ).getSession( );
                Id root = model.add(Type.DATA_ITEM, null);
                root.set(Property.NAME, "ROOT");
                root.set(Property.TYPE, "ROOT");
                root.set(Property.HAS_VALUE; "False");
                do{
                    counter = addID(root, counter);
                }while(counter<symbolVector.size( ));
                root.set(Property.LENGTH, " "+rootLength);
                Model.instance( ).save(root, args[1], Model.DEFAULT, new java.util.Vector( ));
                //Model.instance( ).save(root, "sample.xml", Model.DEFAULT, new java.util.Vector( ));
            }catch (Exception e) {e.printStackTrace( );}
}
else
            trace("No input and output file given\nSyntax is: java SysAdata input.adt output.xml");
}
/**
* skips the given amount of bytes in the SysAdata input file.
*/
public static void skip(int length) {
            try{
                fis.skip(length);
                }catch(java.io.IOException e) {trace(" "+e);}
}
}
/**
* CHSRecord: Common header Section - x0001
* 12byte long, common for all record types
*/
import java.io.*;
class CHSRecord extends Record{
public byte langCode;    // Language Code
public short recordType;   // Record Type
public byte sysadataLevel;// SysAdata Architecture Level
public byte contFlag;    // bit 1: record is continued; bit 2: integers are Little-Endian; bits 3–8: reserved
public byte editionLevel;  // Indicates a new format for a specific record type; usually 0
public int reserve;   // Reserved for future use
public short recordLength; // Record Length following header (in bytes)
/**
```

APPENDIX A-continued

Source Code

```
* Constructor
**/
public CHSRecord(FileInputStream fis){
        fill(fis);
}
/**
* fills all fields of the Common Header Section Record
*/
public void fill(FileInputStream fis) {
        super.fillBuffer(fis, 12);
        langCode = new Integer(buffer[0]).byteValue( );
        recordType = new Integer(buffer[1]+(buffer[2]*256)).shortValue( ); //xchanges byte 2 and 3; shifts byte3 left
        sysadataLevel = new Integer(buffer[3]).byteValue( );
        contFlag = new Integer(buffer[4]).byteValue( );
        editionLevel = new Integer(buffer[5]).byteValue( );
        recordLength = new Integer(buffer[10]+(buffer[11]*256)).shortValue( );
}
/**
* returns length of the following record
*/
public short getrecordLength( ){
        return(recordLength);
}
/**
* returns type of the following record in decimal
*/
public short getrecordType( ){
        return(recordType);
}
/**
* prints out attributes of CHSRecord
*/
public void print( ){
        trace("langCode " + langCode + ";recordType " +recordType+ ";sysadataLevel "+sysadataLevel+ ";contFlag "+contFlag+ ";editionLevel "+editionLevel+ ";recordLength "+recordLength);
    }
}
/**
* Compilation Unit Start/End Record - x0002
* 8 bytes long
*/
import java.io.*;
class CURecord extends Record{
        short type;
/**
* CURecord constructor
*/
public CURecord(FileInputStream fis) {
        fill(fis);
}
/**
* fills all needes fields of the Compilation Unit Start/End Record
*/
public void fill(FileInputStream fis) {
        super.fillBuffer(fis,8);
        type = new Integer(buffer[0]+(buffer[1]*256)).shortValue( );
}
/**
* returns the type of the CURecord
* compilation unit types are: x0000=Start, x0001=end
*/
public int getType( ) {
        return type;
}
}
/**
* Symb IRecord: Common header Section - x0001
* variable length, contains description of all symbols
*
* All get methods are used to fill the DataItems in the XMI Document.
*/
import java.math.*;
class SymbolRecord extends Record {
        //fields of the Common Header Section
        int symbolId;
        byte level;
```

APPENDIX A-continued

Source Code

```java
        byte symbolType;
        byte symbolAttribute;
        byte[ ] clauses = new byte[1];
        BigInteger clausesB;
        byte[ ] flags1 = new byte[1];
        BigInteger flags1B;
        int size;
        int parentId;
        int redefineId;
        short symbolNameLen;
        String symbolName;
        //symbolAttributeValues are put into the attribute tag of the DataItem
        static String symbolAttributeValues[ ] = {
                "",
                "Numeric",
                "Alphanumeric",
                "Group",
                "Pointer",
                "IndexDataItem",
                "IndexName",
                "Condition",
                "","","","","","","","","",
                "File",
                "SortFile",
                "","","","","","",
                "ClassName",
                "ObjectReference"};
/**
* Constructor
*/
public SymbolRecord(java.io.FileInputStream fis, int length) {
        fill(fis, length);
}
/**
* fills needed fields of Symbol Record
*/
public void fill(java.io.FileInputStream fis, int length) {
        super.fillBuffer(fis,length);
        symbolId = new  Integer(buffer[0] + buffer[1]*16*16  + buffer[2]*16*16*16*16  +
buffer[3]*16*16*16*16*16*16).intValue( );
        level = new Integer(buffer[8]).byteValue( );
        symbolType = new Integer(buffer[10]).byteValue( );
        symbolAttribute = new Integer(buffer[11]).byteValue( );
        clauses[0] = new Integer(buffer[12]).byteValue( );
        clausesB = new BigInteger(clauses);
        flags1[0] = new Integer(buffer[13]).byteValue( );
        flags1B = new BigInteger(flags1);
        size  = new  Integer(buffer[20] + buffer[21]*16*16  + buffer[22]*16*16*16*16  +
buffer[23]*16*16*16*16*16*16).intValue( );
        parentId  = new  Integer(buffer[44] + buffer[45]*16*16  + buffer[46]*16*16*16*16  +
buffer[47]*16*16*16*16*16*16).intValue( );
        redefinedId  = new  Integer(buffer[48] + buffer[49]*16*16  + buffer[50]*16*16*16*16  +
buffer[51]*16*16*16*16*16*16).intValue( );
        symbolNameLen = new Integer(buffer[90] + buffer[91]*16*16).shortValue( );
        char[ ] temp = new char[symbolNameLen];
        int j=0;
        for(int i=104;i<(104+symbolNameLen);i++){
            temp[j]=(char)buffer[i];
            j++;
        }
        symbolName = new String(temp);
}
public String getAttribute( ){
        return symbolAttributeValues[symbolAttribute];
        }
public String getLength( ){
        return new Integer(size).toString( );
        }
public int getLevel( ){
        return level;
}
public String getName( ){
        return symbolName;
}
public int getParentId( ){
        return parentId;
}
```

APPENDIX A-continued

Source Code

```
public int getSize( ){
        return size;
}
public int getSymbolId( ){
        return symbolId;
}
public int getType( ){
     return symbolType;
}
/**
* bit 7 is 1 if the symbol is redefined
* symbol is group if symbolAttribute == 3
*/
public boolean has Value( ){
     if(flags1B.testBit(7) || symbolAttribute == 3)
         return false;
     else
         return true;
}
public void print( ) {
        trace("symbolID:"+ symbolId+ ", level:"+ level+", parentId:"+parentId+", size:"+size+",
redefined:"+flags1B.testBit(7)+", symbolAttribute:"+symbolAttribute+", redefinedId:"+redefinedId+",
name:"+symbolName+",hasValue:"+hasValue( ));
}
/**
* bit 5 is high if this symbol redefines another one
*/
public boolean redefines( ){
        return clausesB.testBit(5);
    }
}
```

Appendix B

Classes

In various embodiments, each record type is implemented as a class that understands how to handle the binary data from the SysAdata file 78 and provide the data to other classes via defined access methods. FIG. 9 illustrates the relationship among the classes. A more detailed description on attributes and methods of each class follows. The source code of all classes may be found in Appendix A.

Class Super

This class offers methods and attributes that are needed by all classes.

Attributes

No Attributes defined.

Methods public static void trace(String s) trace is used to trace error statements. It replaces Java's System.out.print( ).

Class Record

This class offers methods and attributes that are needed by all Record classes.

Attributes int[ ] buffer Array of ints that stores the actual data from the SysAdata file 78.

int length Stores the size of the buffer array.

Methods public void fillBuffer(FileInputStream fis, int_length) Fills the buffer array.

Class SysAdata

SysAdata wraps methods and attributes to read the SysAdata file 78 and create the XML document template 58. Initially, the complete SysAdata file 78 is processed and all data-entry symbols are saved in the symbolVector. Thereafter, the symbolVector is processed and an XMI model that resembles the document is created.

Attributes

FileInputStream fis Wraps the input adata file.

CHSRecord chs_rec Is used to temporarly save a CHSRecord.

CURecord cu_rec Is used to temporarly save a CURecord.

Vector symbolVector The symbolVector stores all SymbolRecords that are extracted from the adata file.

Id model model is the root element for the XMI toolkit object hierarchy.

int rootLength Stores the added up length of all DataItem.VALUEs.

Methods public static void main(String args[ ]) The main method contains the actual loop, in which the SysAdata file is processed. The assembly of the model for the XML document template 58 is initiated here as well.

public static int addID(Id parent, int symbolNumber) Recursive method to assemble the model that is then saved as XML. Parameters are: -the parents Id, such that the next symbol can be added on the right level. -the position number of the symbol to be added in the symbolVector. addID returns the index of the next SymbolRecord object to be processed.

public static void skip(int length) Replaces FileInputStream.skip( ).

Class CHSRecord

Throughout the processing of the SysAdata file 78, each common header section instantiates this class.

Attributes

A description of these attributes is found in Table 1.

byte langcode short recordType byte sysadatalevel byte contFlag
byte editionLevel
public int reserve
public short recordLength
Methods
public CHSRecord(FileInputStream fis) The constructor instantiates the CHSRecord class. The FileInputStream object is handed over from the calling instance.
public void fill(FileInputStream fis) Calls Record.fillBuffer( ) and then extracts the binary data stored in buffer[ ] into the referring attribute.
public short getrecordlength( ) Returns the length of the following record. Is needed in one embodiment to process the input file correctly.
public short getrecordType( ) Returns the record type.
Class CURecord
A compilation unit start/end record instantiates this class. The CURecord class is used to control the processing of the SysAdata file 78. In certain embodiments, if getType( ) returns 1, the processing is stopped.
Attributes
short type
Methods
public CURecord(FileInputStream fis) The constructor instantiates the CURecord class. The FileInputStream object is handed over from the calling instance.
public void fill(FileInputStream fis) Calls Record.fillBuffer( ) and then extracts the binary data stored in buffer[ ] into the refering attribute.

public int getType( )
Class SymbolRecord
Any symbol record found during the processing of the SysAdata file 78 instantiates this class.
Attributes
A detailed description of these attribute is given in Table 3. The clauses and the flags1 attribute are converted into BigIntegers and are therefore stored in an array with size one to provide the correct input to the BigInteger constructor. The BigInteger object is used, because it allows bit-operations on its value.
int symbolId
byte level
byte symbolType
byte symbolAttribute
byte[ ] clauses=new byte[1]
BigInteger clausesB
byte[ ] flags1=-new byte[1]
BigInteger flags1B
int size
int parentId
int redefinedId
short symbolNameLen
String symbolName
static String symbolAttributeValues[ ]
This array contains descriptive names for the DataItem.TYPE tag.

APPENDIX C

| Document Type Definition (DTD) |
| --- |

```
<?xml version="1.0" encoding="UTF-8" ?>
<!-- XMI Automatic DTD Generation    -->
<!-- Metamodel: DataItem             -->
<!-- _____  -->
<!--                                 -->
<!--                                 -->
<!-- XMI is the top-level XML element for XMI transfer text -->
<!-- _____  -->
<!ELEMENT XMI (XMI.header, XMI.content?, XMI.difference*,
        XMI.extensions*)>
<!ATTLIST XMI
        xmi.version CDATA #FIXED "1.0"
        timestamp CDATA #IMPLIED
        verified (true  |  false) #IMPLIED
>
<!-- _____  -->
<!--                                 -->
<!-- XMI.header contains documentation and identifies the model, -->
<!-- metamodel, and metametamodel    -->
<!-- _____  -->
<!ELEMENT XMI.header (XMI.documentation?, XMI.model*, XMI.metamodel*,
        XMI.metametamodel*)>
<!-- _____  -->
<!--                                 -->
<!-- documentation for transfer data -->
<!-- _____  -->
<!ELEMENT XMI.documentation (#PCDATA  |  XMI.owner   |   XMI.contact  |
        XMI.longDescription  |  XMI.shortDescription  |
        XMI.exporter  |  XMI.exporterVersion  |
        XMI.notice)* >
<!ELEMENT XMI.owner ANY >
<!ELEMENT XMI.contact ANY >
<!ELEMENT XMI.longDescription ANY >
<!ELEMENT XMI.shortDescription ANY >
<!ELEMENT XMI.exporter ANY >
<!ELEMENT XMI.exporterVersion ANY >
<!ELEMENT XMI.exporterID ANY >
<!ELEMENT XMI.notice ANY >
```

APPENDIX C-continued

Document Type Definition (DTD)

```
<!--                                                                -->
<!--                                                                -->
<!--  XMI.element.att defines the attributes that each XML element  -->
<!--  that corresponds to a metamodel class must have to conform to -->
<!--  the XMI specification.                                        -->
<!--                                                                -->
<!ENTITY % XMI.element.att
        'xmi.id ID #IMPLIED xmi.label CDATA #IMPLIED xmi.uuid
        CDATA #IMPLIED' >
<!--                                                                -->
<!--                                                                -->
<!--  XMI.link.att defines the attributes that each XML element that -->
<!--  corresponds to a metamodel class must have to enable it to    -->
<!--  function as a simple XLink as well as refer to model          -->
<!--  constructs within the same XMI file.                          -->
<!--                                                                -->
<!ENTITY % XMI.link.att
        'xml:link CDATA #IMPLIED inline (true  |  false) #IMPLIED
        actuate (show  |  user) #IMPLIED href CDATA #IMPLIED role
        CDATA #IMPLIED title CDATA #IMPLIED show (embed  |  replace
        |  new) #IMPLIED behavior CDATA #IMPLIED xmi.idref IDREF
        #IMPLIED xmi.uuidref CDATA #IMPLIED' >
<!--                                                                -->
<!--                                                                -->
<!--  XMI.model identifies the model(s) being transferred           -->
<!--                                                                -->
<!ELEMENT XMI.model ANY >
<!ATTLIST XMI.model
        %XMI.link.att;
        xmi.name      CDATA #REQUIRED
        xmi.version   CDATA #IMPLIED
>
<!--                                                                -->
<!--                                                                -->
<!--  XMI.metamodel identifies the metamodel(s) for the transferred -->
<!--  data                                                          -->
<!--                                                                -->
<!ELEMENT XMI.metamodel ANY >
<!ATTLIST XMI.metamodel
        %XMI.link.att;
        xmi.name      CDATA #REQUIRED
        xmi.version   CDATA #IMPLIED
>
<!--                                                                -->
<!--                                                                -->
<!--  XMI.metametamodel identifies the metametamodel(s) for the     -->
<!--  transferred data                                              -->
<!--                                                                -->
<!ELEMENT XMI.metametamodel ANY >
<!ATTLIST XMI.metametamodel
        %XMI.link.att;
        xmi.name      CDATA #REQUIRED
        xmi.version   CDATA #IMPLIED
>
<!--                                                                -->
<!--                                                                -->
<!--  XMI.content is the actual data being transferred              -->
<!--                                                                -->
<!ELEMENT XMI.content ANY >
<!--                                                                -->
<!--                                                                -->
<!--  XMI.extensions contains data to transfer that does not conform -->
<!--  to the metamodel(s) in the header                             -->
<!--                                                                -->
<!ELEMENT XMI.extensions ANY >
<!ATTLIST XMI.extensions
        xmi.extender CDATA #REQUIRED
>
<!--                                                                -->
<!--                                                                -->
<!--  extension contains information related to a specific model    -->
<!--  construct that is not defined in the metamodel(s) in the header -->
<!--                                                                -->
<!ELEMENT XMI.extension ANY >
<!ATTLIST XMI.extension
        %XMI.element.att;
        %XMI.link.att;
```

APPENDIX C-continued

Document Type Definition (DTD)

```
        xmi.extender   CDATA #REQUIRED
        xmi.extenderID CDATA #REQUIRED
>
<!--  _____  -->
<!--                                                  -->
<!--  XMI.difference holds XML elements representing differences to a  -->
<!--  base model                                      -->
<!--  _____  -->
<!ELEMENT XMI.difference (XMI.difference | XMI.delete | XMI.add |
        XMI.replace)* >
<!ATTLIST XMI.difference
        %XMI.element.att;
        %XMI.link.att;
>
<!--  _____  -->
<!--                                                  -->
<!--  XMI.delete represents a deletion from a base model  -->
<!--  _____  -->
<!ELEMENT XMI.delete EMPTY >
<!ATTLIST XMI.delete
        %XMI.element.att;
        %XMI.link.att;
>
<!--  _____  -->
<!--                                                  -->
<!--  XMI.add represents an addition to a base model  -->
<!--  _____  -->
<!ELEMENT XMI.add ANY >
<!ATTLIST XMI.add
        %XMI.element.att;
        %XMI.link.att;
        xmi.position CDATA "−1"
>
<!--  _____  -->
<!--                                                  -->
<!--  XMI.replace represents the replacement of a model construct  -->
<!--  with another model construct in a base model   -->
<!--  _____  -->
<!ELEMENT XMI.replace ANY >
<!ATTLIST XMI.replace
        %XMI.element.att;
        %XMI.link.att;
        xmi.position CDATA "−1"
>
<!--  _____  -->
<!--                                                  -->
<!--  XMI.reference may be used to refer to data types not defined in  -->
<!--  the metamodel                                   -->
<!--  _____  -->
<!ELEMENT XMI.reference ANY >
<!ATTLIST XMI.reference
        %XMI.link.att;
>
<!--  _____  -->
<!--                                                  -->
<!--  This section contains the declaration of XML elements  -->
<!--  representing data types                         -->
<!--  _____  -->
<!ELEMENT XMI.TypeDefinitions ANY >
<!ELEMENT XMI.field ANY >
<!ELEMENT XMI.seqItem ANY >
<!ELEMENT XMI.octetStream (#PCDATA) >
<!ELEMENT XMI.unionDiscrim ANY >
<!ELEMENT XMI.enum EMPTY >
<!ATTLIST XMI.enum
        xmi.value CDATA #REQUIRED
>
<!ELEMENT XMI.any ANY >
<!ATTLIST XMI.any
        %XMI.link.att;
        xmi.type CDATA #IMPLIED
        xmi.name CDATA #IMPLIED
>
<!ELEMENT XMI.CorbaTypeCode (XMI.CorbaTcAlias  |  XMI.CorbaTcStruct  |
            XMI.CorbaTcSequence  |  XMI.CorbaTcArray   |
            XMI.CorbaTcEnum      |  XMI.CorbaTcUnion   |
            XMI.CorbaTcExcept    |  XMI.CorbaTcString  |
```

APPENDIX C-continued

Document Type Definition (DTD)

```
            XMI.CorbaTcWstring    |   XMI.CorbaTcShort    |
            XMI.CorbaTcLong       |   XMI.CorbaTcUshort   |
            XMI.CorbaTcUlong      |   XMI.CorbaTcFloat    |
            XMI.CorbaTcDouble     |   XMI.CorbaTcBoolean  |
            XMI.CorbaTcChar       |   XMI.CorbaTcWchar    |
            XMI.CorbaTcOctet      |   XMI.CorbaTcAny      |
            XMI.CorbaTcTypeCode   |   XMI.CorbaTcPrincipal |
            XMI.CorbaTcNull       |   XMI.CorbaTcVoid     |
            XMI.CorbaTcLongLong   |
            XMI.CorbaTcLongDouble) >
<!ATTLIST XMI.CorbaTypeCode
        %XMI.element.att;
>
<!ELEMENT XMI.CorbaTcAlias (XMI.CorbaTypeCode) >
<!ATTLIST XMI.CorbaTcAlias
        xmi.tcName CDATA #REQUIRED
        xmi.tcId CDATA #IMPLIED
>
<!ELEMENT XMI.CorbaTcStruct (XMI.CorbaTcField)* >
<!ATTLIST XMI.CorbaTcStruct
        xmi.tcName CDATA #REQUIRED
        xmi.tcId   CDATA #IMPLIED
>
<!ELEMENT XMI.CorbaTcField (XMI.CorbaTypeCode) >
<!ATTLIST XMI.CorbaTcField
        xmi.tcName CDATA #REQUIRED
>
<!ELEMENT XMI.CorbaTcSequence (XMI.CorbaTypeCode
            XMI.CorbaRecursiveType) >
<!ATTLIST XMI.CorbaTcSequence
        xmi.tcLength CDATA #REQUIRED
>
<!ELEMENT XMI.CorbaRecursiveType EMPTY >
<!ATTLIST XMI.CorbaRecursiveType
        xmi.offset CDATA #REQUIRED
>
<!ELEMENT XMI.CorbaTcArray (XMI.CorbaTypeCode) >
<!ATTLIST XMI.CorbaTcArray
        xmi.tcLength CDATA #REQUIRED
>
<!ELEMENT XMI.CorbaTcObjRef EMPTY >
<!ATTLIST XMI.CorbaTcObjRef
        xmi.tcName CDATA #REQUIRED
        xmi.tcId   CDATA #IMPLIED
>
<!ELEMENT XMI.CorbaTcEnum (XMI.CorbaTcEnumLabel) >
<!ATTLIST XMI.CorbaTcEnum
        xmi.tcName CDATA #REQUIRED
        xmi.tcId   CDATA #IMPLIED
>
<!ELEMENT XMI.CorbaTcEnumLabel EMPTY >
<!ATTLIST XMI.CorbaTcEnumLabel
        xmi.tcName CDATA #REQUIRED
>
<!ELEMENT XMI.CorbaTcUnionMbr (XMI.CorbaTypeCode, XMI.any) >
<!ATTLIST XMI.CorbaTcUnionMbr
        xmi.tcName CDATA #REQUIRED
>
<!ELEMENT XMI.CorbaTcUnion (XMI.CorbaTypeCode, XMI.CorbaTcUnionMbr*) >
<!ATTLIST XMI.CorbaTcUnion
        xmi.tcName CDATA #REQUIRED
        xmi.tcId   CDATA #IMPLIED
>
<!ELEMENT XMI.CorbaTcExcept (XMI.CorbaTcField)* >
<!ATTLIST XMI.CorbaTcExcept
        xmi.tcName CDATA #REQUIRED
        xmi.tcId   CDATA #IMPLIED
>
<!ELEMENT XMI.CorbaTcString EMPTY >
<!ATTLIST XMI.CorbaTcString
        xmi.tcLength CDATA #REQUIRED
>
<!ELEMENT XMI.CorbaTcWstring EMPTY >
<!ATTLIST XMI.CorbaTcWstring
        xmi.tcLength CDATA #REQUIRED
>
<!ELEMENT XMI.CorbaTcFixed EMPTY >
```

APPENDIX C-continued

Document Type Definition (DTD)

```
<!ATTLIST XMI.CorbaTcFixed
        xmi.tcDigits CDATA #REQUIRED
        xmi.tcScale CDATA #REQUIRED
>
<!ELEMENT XMI.CorbaTcShort EMPTY >
<!ELEMENT XMI.CorbaTcLong EMPTY >
<!ELEMENT XMI.CorbaTcUshort EMPTY >
<!ELEMENT XMI.CorbaTcUlong EMPTY >
<!ELEMENT XMI.CorbaTcFloat EMPTY >
<!ELEMENT XMI.CorbaTcDouble EMPTY >
<!ELEMENT XMI.CorbaTcBoolean EMPTY >
<!ELEMENT XMI.CorbaTcChar EMPTY >
<!ELEMENT XMI.CorbaTcWchar EMPTY >
<!ELEMENT XMI.CorbaTcOctet EMPTY >
<!ELEMENT XMI.CorbaTcAny EMPTY >
<!ELEMENT XMI.CorbaTcTypeCode EMPTY >
<!ELEMENT XMI.CorbaTcPrincipal EMPTY >
<!ELEMENT XMI.CorbaTcNull EMPTY >
<!ELEMENT XMI.CorbaTcVoid EMPTY >
<!ELEMENT XMI.CorbaTcLongLong EMPTY >
<!ELEMENT XMI.CorbaTcLongDouble EMPTY >
<!-- _____ -->
<!-- _____ -->
<!--    METAMODEL: DataItem                   -->
<!-- _____ -->
<!ELEMENT DataItem.child (DataItem)* >
<!-- _____ -->
<!-- _____ -->
<!--    METAMODEL CLASS: DataItem             -->
<!-- _____ -->
<!ELEMENT DataItem.Name(#PCDATA   |   XMI.reference)* >
<!ELEMENT DataItem.Type EMPTY >
<!ATTLIST DataItem.Type
        xmi.value ( Root | Numeric | Alphanumeric | Group ) #REQUIRED
>
<!ELEMENT DataItem.Length (#PCDATA   |   XMI.reference)* >
<!ELEMENT DataItem.hasValue EMPTY >
<!ATTLIST DataItem.hasValue
        xmi.value ( true | false ) #REQUIRED
>
<!ELEMENT DataItem.Value (#PCDATA   |   XMI.reference)* >
<!ELEMENT DataItem.parent (DataItem)? >
<!ELEMENT DataItem (DataItem.Name?, DataItem.Type?, DataItem.Length?,
            DataItem.hasValue?, DataItem.Value?, XMI.extension*,
            DataItem.parent?, DataItem.child*)? >
<!ATTLIST DataItem
        %XMI.element.att;
        %XMI.link.att;
>
```

What is claimed is:

1. A computer-implemented method for representing transaction processing system messages as XML documents, the method comprising:

generating an XML document template from a transaction processing system message definition, the message definition representative of the syntax and semantics for messages exchanged with the transaction processing system;

merging a transaction processing system message with the generated template to produce a corresponding XML document; and wherein generating an XML document template comprises:

obtaining a transaction processing system message definition;

obtaining a DTD for representing arbitrary transaction processing system message definitions; and parsing the transaction processing system message definition using the DTD to generate an XML document template corresponding to the transaction processing system message definition.

2. A computer-implemented method for representing transaction processing system messages as XML documents, the method comprising:

generating an XML document template from a transaction processing system message definition, the message definition representative of the syntax and semantics for messages exchanged with the transaction processing system;

merging a transaction processing system message with the generated template to produce a corresponding XML document; and wherein generating an XML document template comprises:

obtaining a transaction processing system message definition;

obtaining a DTD for representing arbitrary transaction processing system message definitions;

compiling the transaction processing system message definition with an option configured to produce an associated data (Adata) file; and parsing the Adata file using the DTD to generate an XML document template corresponding to the transaction processing system message definition.

3. The method of claim 2, wherein the Adata file comprises a transaction processing system message definition in a format substantially semantically equivalent to program source code from which the transaction processing system message definition originates.

4. The method of claim 2, wherein obtaining the transaction processing system message definition comprises:
extracting the transaction processing system message definition from one of an application source code file and a copy file.

5. The method of claim 2, wherein the step of obtaining the DTD comprises:
creating a UML object model for representing arbitrary transaction processing system message definitions; and
processing the object model using an XMI utility to generate the DTD.

6. The method of claim 2, wherein the merging step comprises:
identifying a placeholder within the XML document template for receiving a corresponding value from the transaction processing system message;
reading the value from the transaction processing system message; and
inserting the value into a location within the XML document template indicated by the placeholder.

7. The method of claim 6, wherein the placeholder comprises an XML tag.

8. The method of claim 6, wherein the identifying step comprises:
checking the placeholder for an associated tag indicating that a corresponding value exists within the transaction processing system message.

9. The method of claim 6, wherein the placeholder has an associated tag indicating the size of the corresponding value within the transaction processing system message, the reading step comprising:
reading a portion of the transaction processing system message corresponding to the indicated size.

10. A system for representing transaction processing system messages as XML documents, the system comprising:
a processor;
a template generation module configured to generate an XML document template from a transaction processing system message definition, the message definition representative of the syntax and semantics for messages exchanged with the transaction processing system;
a merging module configured to merge a transaction processing system message with the generated template to produce a corresponding XML document; and
wherein the template generation module comprises:
a parser configured to obtain a DTD for representing arbitrary transaction processing system message definitions and parse the transaction processing system message definition using the DTD to generate an XML document template corresponding to the transaction processing system message definition.

11. A system for representing transaction processing system messages as XML documents, the system comprising:
a processor:
a template generation module configured to generate an XML document template from a transaction processing system message definition, the message definition representative of the syntax and semantics for messages exchanged with the transaction processing system;
a merging module configured to merge a transaction processing system message with the generated template to produce a corresponding XML document; and
wherein the template generation module comprises:
a compiler configured to compile a transaction processing system message definition with an option configured to produce an associated data (Adata) file; and
a parser configured to parse the Adata file using a DTD for representing arbitrary transaction processing system message definitions to generate an XML document template corresponding to the transaction processing system message definition.

12. The system of claim 11, wherein the Adata file comprises a transaction processing system message definition in a format substantially semantically equivalent to program source code from which the transaction processing system message definition originates.

13. The system of claim 11, further comprising:
a message definition extractor configured to extract the transaction processing system message definition from one of an application source code file and a copy file.

14. The system of claim 11, further comprising:
a modeling tool configured to create a UML object model for representing arbitrary transaction processing system message definitions; and
an XMI utility for generating the DTD from the UML object model.

15. The system of claim 11, wherein the merging module is further configured to identify a placeholder within XML document template for receiving a corresponding value from the transaction processing system message; read the value from the transaction processing system message; and insert the value into a location within the XML document template indicated by the placeholder.

16. The system of claim 15, wherein the placeholder comprises an XML tag.

17. The system of claim 15, wherein the placeholder comprises an associated tag indicating whether a corresponding value exists within the transaction processing system message.

18. The system of claim 15, wherein the placeholder has an associated tag indicating the size of the corresponding value within the transaction processing system message.

19. An article of manufacture comprising a program storage medium readable by a processor and embodying one or more instructions executable by the processor to perform a computer-implemented method for representing transaction processing system messages as XML documents, the method comprising:
generating an XML document template from a transaction processing system message definition, the message definition representative of the syntax and semantics for messages exchanged with the transaction processing system;
merging a transaction processing system message with the generated template to produce a corresponding XML document; and
wherein the generation step comprises:
obtaining a transaction processing system message definition;
obtaining a DTD for representing arbitrary transaction processing system message definitions;
compiling the transaction processing system message definition with an option configured to produce an associated data (Adata) file; and parsing the Adata file using the DTD to generate an XML document template corresponding to the transaction processing system message definition.

20. The article of claim 19, wherein the transaction processing system message definition comprises program source code in a language selected from the group consisting of COBOL, PL/I, Assembler, and Pascal.

21. The article of claim 19, wherein the Adata file comprises a transaction processing system message definition in a format substantially semantically equivalent to program source code from which the transaction processing system message definition originates.

22. The article of claim 19, wherein obtaining the transaction processing system message definition comprises:

extracting the transaction processing system message definition from one of an application source code file and a copy file.

23. The article of claim 19, wherein the step of obtaining the DTD comprises:

creating a UML object model for representing arbitrary transaction processing system message definitions; and processing the object model using an XMI utility to generate the DTD.

24. The article of claim 19, wherein the merging step comprises:

identifying a placeholder within XML document template for receiving a corresponding value from the transaction processing system message;

reading the value from the transaction processing system message; and inserting the value into a location within the XML document template indicated by the placeholder.

25. The article of claim 24, wherein the placeholder comprises an XML tag.

26. The article of claim 24, wherein the identifying step comprises:

checking the placeholder for an associated tag indicating that a corresponding value exists within the transaction processing system message.

27. The article of claim 24, wherein the placeholder has an associated tag indicating the size of the corresponding value within the transaction processing system message, the reading step comprising:

reading a portion of the transaction processing system message corresponding to the indicated size.

\* \* \* \* \*